April 16, 1968

F. WEISS 3,377,865

ECCENTRIC ADJUSTMENT FOR INFINITELY
VARIABLE SWITCH GEAR MECHANISMS

Filed March 23, 1966

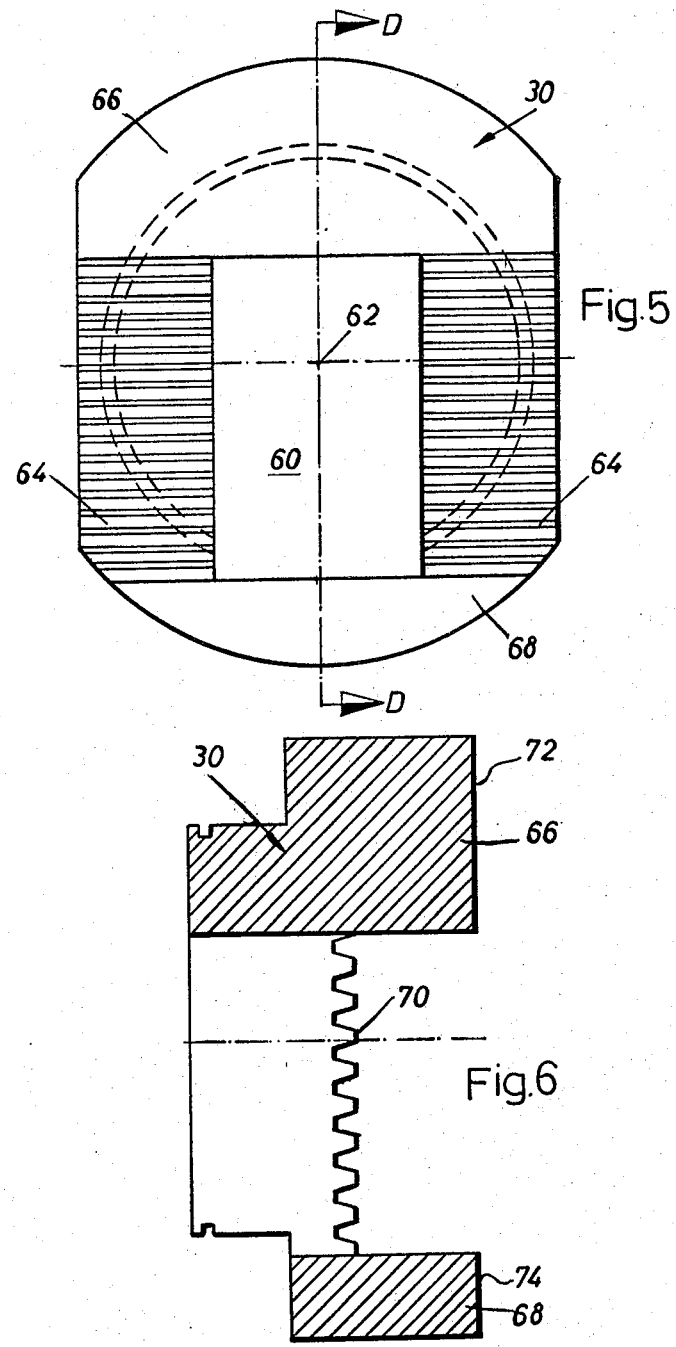

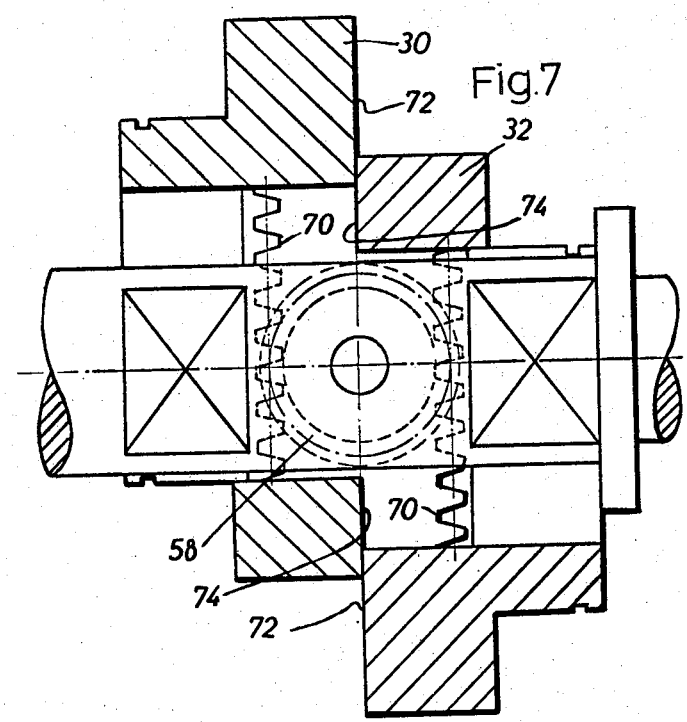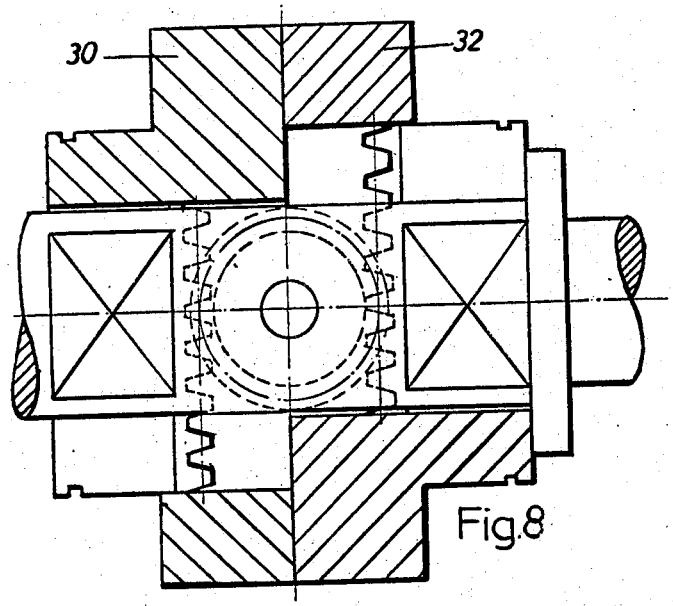

3,377,865
ECCENTRIC ADJUSTMENT FOR INFINITELY
VARIABLE SWITCH GEAR MECHANISMS
Franz Weiss, 2 Rudolf Dieselstrasse,
Illertissen, Germany
Filed Mar. 23, 1966, Ser. No. 536,853
13 Claims. (Cl. 74—393)

ABSTRACT OF THE DISCLOSURE

An eccentric adjustment for an infinitely variable switch gear mechanism in which the uniform rotational movement of a drive shaft is transformed by gear means in alternative movements of oscillating levers and reduced by one way coupling means to a periodic rotational movement of a driven shaft with a driver rotating with the drive shaft.

---

Figure 1:
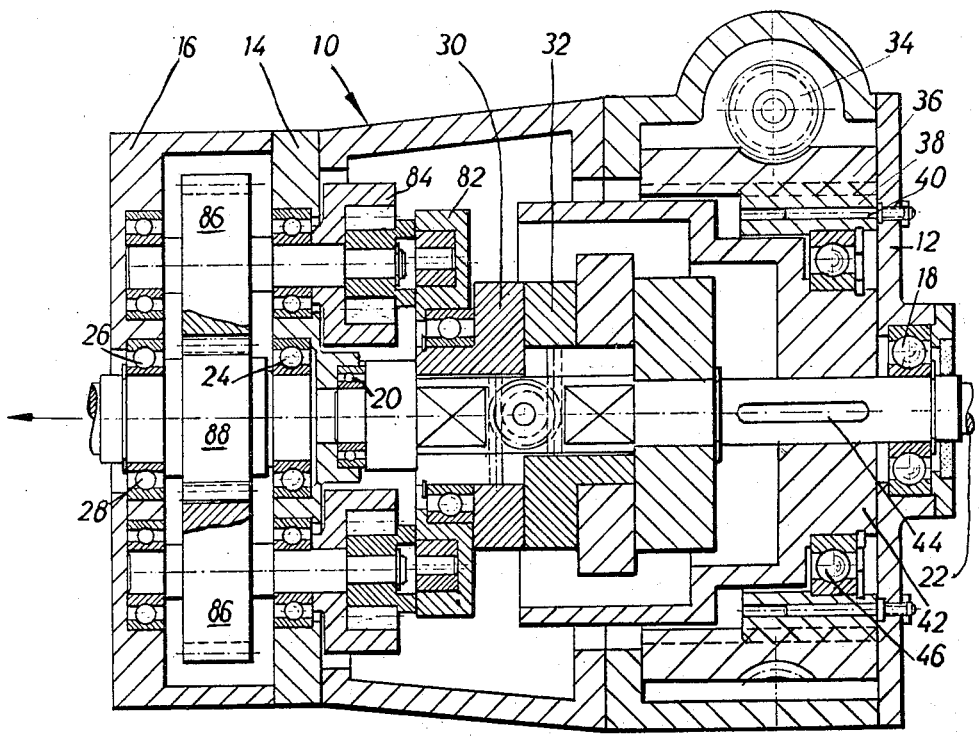

The present invention relates to an eccentric adjustment for infinitely adjustable shift gear mechanisms in which the uniform rotational movement of a drive shaft is transformed by means of a gear mechanism, and is reduced by means of one way coupling devices into a periodic rotational movement of a driven shaft fluctuating around an average value.

Such a known eccentric adjustment has a driver rotating together with the drive shaft carrying at least one freely rotatable pinion which meshes with teeth in the form of a rack bar on a member axially shiftable by means of an operating device also rotating with the drive shaft and being connected in a form-locking manner with the teeth of a radially shiftable eccentric disk, and with the eccentricity adjustment of which a counterweight is adjusted synchronously.

In the known eccentric adjustment, the driver has at its inner circumference two interior teeth arrangements diametrically opposite to each other which mesh with two pinions rotatably supported by and mounted on different shafts arranged in parallelism. On one shaft there is located the eccentric disk, while on the other shaft is located the counterpiece. Correspondingly, one of the pinions is in mesh with the eccentric disk and the other pinion with the counterweight. The synchronous movement is obtained only due to the fact that both pinions are simultaneously in mesh with the driver and are rotated during its axial movement. A disadvantage resides in the fact that the eccentric disk consists of the eccentric ring per se and a component provided with the teeth, which are screwed together on their front sides. A vibration-free running, i.e. an absolute mass equilibration, cannot be achieved by means of the known device. In addition, the supporting of these two adjusting masses is difficult and lockings or bindings may occur as each adjusting mass is in engagement with only one pinion. Finally, the space requirements of the known gear mechanism are rather extensive.

It is an object of the invention to overcome the disadvantages present in the known adjustment device for infinitely variable shift gear mechanisms.

This problem is solved, according to the invention, by the fact that the eccentric and the counter-weight provided with teeth facing each other are meshed with a toothed wheel mounted on a common shaft together with the pinion. The driver is preferably defined by a fork having its two legs extending symmetrically on both sides parallel to the drive shaft. Each leg journals one shaft with one pinion and toothed wheel, so that both the eccentric and the counter-weight are each provided with a pair of teeth, i.e. two teethed racks arranged in parallelism.

The present adjusting device is especially efficacious in that it is self-locking (an automatic adjustment of the eccentrics is prevented). As the driving eccentric and the compensation eccentric are adjusted by a toothed wheel pair common to both components, an extremely exact eccentricity adjustment and thus a practically vibration-free operation are obtained in view of the precise static and dynamic balancing. The adjustment of the eccentricity takes place, by means of a hand wheel, and/or an adjusting motor whereby the time of adjustment may be fixed. The adjusting power is very low and independent of whether the adjustment is under load or without load. The use of two toothed wheels on each side of the shaft each of which is in engagement with two teeth arrangements of the eccentrics positively excludes a locking or binding in the adjustment. Furthermore, even fine adjustments are possible under load and torque transformation with a fully positive connection as well as an absolute constancy without any particular holding devices, whereby an infinitely variable adjustment is feasible.

A suitable embodiment of the invention resides in the fact that the shaft carrying the pinion and the toothed wheel has on its inner end a counter bearing in the drive shaft. The drive shaft is provided with two diametrically opposed blind holes in which the ends of the shaft engage whereby each shaft is supported in a double bearing. Preferably, each toothed wheel lies between a driver leg and the drive shaft and the pinion is rotatably connected to the shaft on the other side of the driver leg.

A particularly suitable embodiment resides in the fact that the eccentric and the counter-weights are of the same configuration, but are reversely arranged and peripherally offset by 180° on the drive shaft. Hence, it is assured that the present adjusting device is completely symmetrical so that a perfect mass equilibration is realized.

The eccentric is laterally flattened in parallel to the legs of the driver and in its radial shifting direction is provided with a longitudinal orifice having parallel lateral guide surfaces which are guided directly or by means of flat intermediate plates on flattened surfaces of the drive shaft. The webs limiting laterally the longitudinal opening have the teeth on their front surfaces.

Finally, an advantageous feature is that the sections of the eccentric bridging the webs on both sides of the drive shaft and thus the compensation weight project at the front by substantially the radius of the toothed wheel or toothed wheels respectively, in mesh with the teeth of the webs so that the frontal surfaces facing each other of the projecting section of the eccentric and of the composition weight engage and guide each other. The eccentric constituting the driving eccentric and the compensation weight constituting the compensation eccentric are thus supported very accurately on the shaft whereby at high speeds and heavy loads an easy adjustment with a slight clearance after a prolonged service time is possible.

A further aspect of the invention resides in the fact that the axially shiftable member is defined in a fork-type manner and the legs thereof are provided with two parallel axially extending teeth arrangements with which the pinion is in mesh. The parallel teeth arrangements opposite each other are racks which are each in mesh at diametrically opposed locations with the pinion so that neither the toothed wheels nor pinions can be subjected to unilateral pressure loads. A particularly space-saving arrangement is realized since the legs have a segment shaped configuration in which is a recess for the path movement of the pinion as well as a slide guide parallel thereto for the leg of the driver. In spite of the fact the shiftable member as well as the driver are secured against rotation of the drive shaft, the smallest relative rotations are avoided, by guiding the shiftable member in the driver.

Figure 4:
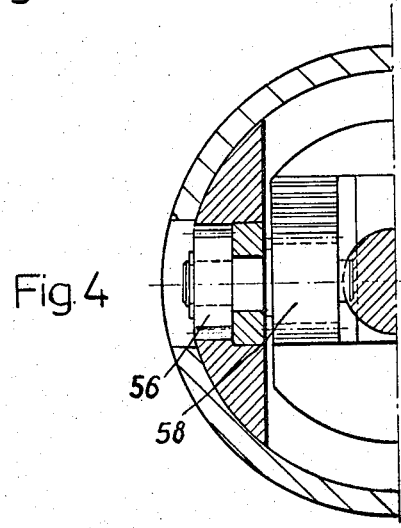
Figure 2:
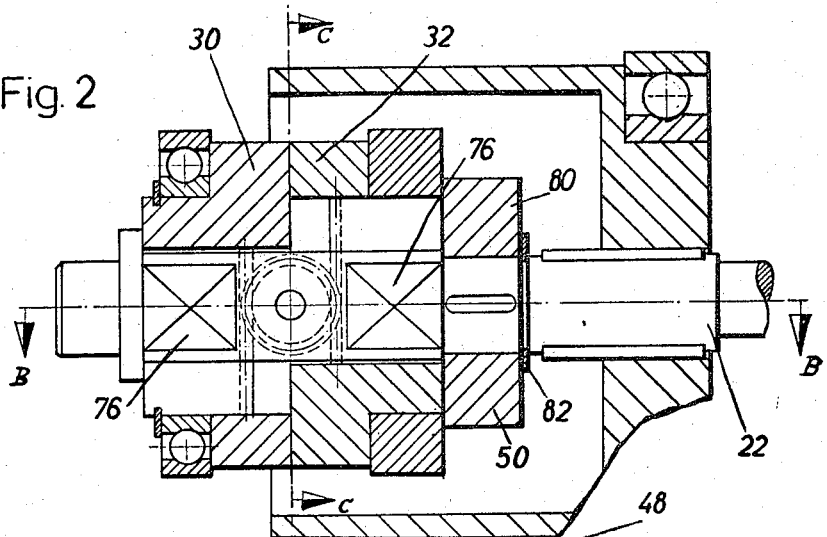
Figure 3:
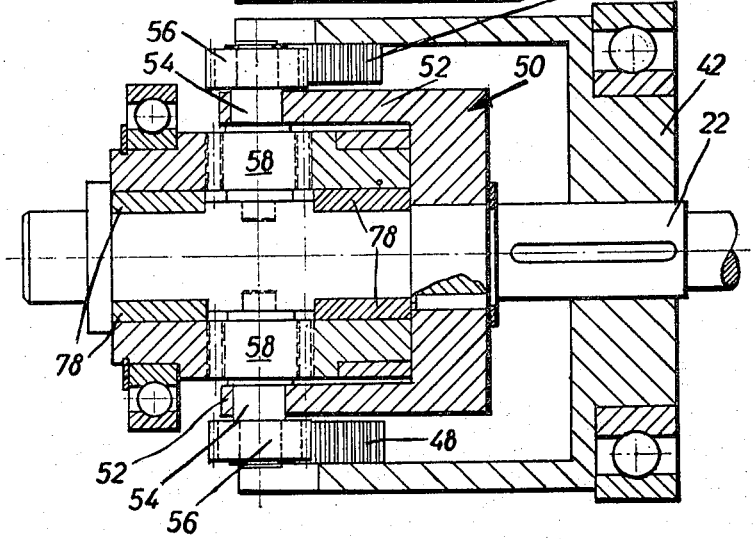

Additional important objects and advantages of the invention will become more readily apparent to persons skilled in the art from the following detailed specification and annexed drawings and in which drawings:

FIG. 1 is a view in longitudinal section through the switch gear mechanism,

FIG. 2 is an enlarged sectional view of the eccentric arrangement of the switch gear mechanism according to FIG. 1, FIG. 3 is a view of the eccentric arrangement taken along line B—B of FIG. 2, FIG. 4 is a view taken along line C—C of FIG. 2, FIG. 5 is an enlarged view of the eccentric disk seen in the axial direction, FIG. 6 is a view taken along line D—D of FIG. 5, FIG. 7 is a sectional view of the two eccentrics in a maximum adjustment position, and FIG. 8 is a sectional view of the eccentrics in the zero position of the drive eccentric.

A casing 10 of a switch gear mechanism has a front wall cover 12, a partition 14 and a further partition 16. A drive shaft 22 is supported in a bearing 18 for the front wall cover and a bearing 20 for the partition 14. A driven shaft 28 is supported in bearing 24 of the partition 14 and bearing 26 of the partition 16. The drive shaft and the driven shaft are arranged coaxially. On the drive shaft are radially adjustable eccentrics, i.e. a driving eccentric 30 and a compensation eccentric 32. Both eccentrics 30 and 32 are not shiftable axially but only radially, i.e. vertically to the axis of the drive shaft.

A worm 34 is supported in the casing 10 and is arranged so as to project over said casing and may be rotated by means of a hand wheel or a motor. The worm 34 is in mesh with a worm wheel 36 arranged concentrally to the axis of shaft 22. A threaded ring 38 is in mesh with the interior thread of the worm wheel 36, and the threaded ring is prevented against rotation by means of fixed guide bolts 40 with the worm wheel 36 so that it merely shifts axially when the worm wheel 36 is rotated. A pot-shaped member 42 is fixed on the drive shaft 22 by means of a key 44 on the shaft 22 so that it cannot rotate, but can be shifted axially. A ball bearing 46 represents the connection between the threaded ring 38 and the pot-shaped member 42. The threaded ring 38 in its axial movement takes along the pot-shaped member member 42, but the ring does not prevent rotation of the member 42 with the shaft 22.

As shown in FIG. 3, axial teeth in the form of racks 48 are fastened to the pot-shaped member 42. A fork-shaped driver 50 is keyed on the shaft 22, and legs 52 thereof carry shafts 54 arranged transversely to the axis of the drive shaft 22, with both shafts 54 being arranged on the same axis. A pinion 56 is carried by the outer end of each shaft 54 and the pinions mesh with the racks 48. The shafts 56 each have a toothed wheel or gear 58. The inner ends of the shafts 54 engage blind holes of the drive shaft 22 at diametrically opposed points so that each shaft 54 is doubly supported.

The driving excentric 30 and the compensation eccentric 32 have the same configuration. As shown in FIGS. 5 and 6 (in which an eccentric 30 is shown) the latter is provided with a longitudinal orifice 60 of a constant width and arranged eccentrically to axis 62 of the drive shaft 22. The orifice 60 is limited by two webs 64, an upper projection 65 and a lower projection 68. Due to the eccentricity of the orifice 60, the height of the upper projection 66 is greater than that of the lower projection 68. The front surfaces of the web 64 are provided with teeth in the form of a rack 70. As shown in FIGS. 7 and 8, the toothed wheels 58 mesh with the rack 70 of the driving eccentric 30 and the compensation eccentric 32. The projections 66 and 68 extend axially approximately the radius of the toothed wheels 58 from the teeth of the racks 70 towards the front so that front surfaces 72 and 74 of the projections 66 and 68 engage each other, while the toothed wheels 58 are each in engagement with both racks 70. If the two toothed wheels 58 are rotated, the two eccentrics 30 and 32 shift in a radial direction opposite to each other, with their front surfaces 72 and 74 sliding on each other. The above opposite movement of the two eccentrics 30 and 32 in connection with the identical configuration, but with a mirror-symmetrical arrangement of the two eccentrics, ensures a complete mass equilibration in rotation in any adjustment position. As shown in FIGS. 2 and 3, the drive shaft 22 has flats 76 extending to both sides in each of the bearing ranges for the eccentrics 30 and 32, and the flats serve as a lateral guide for the eccentrics 30 and 32 by using prismatic plates 78. The two eccentrics 30 and 32 are arranged in an axially non-shiftable manner by means of a fixed ring 80 which is axially secured by means of a spring ring 82. In their adjustment they are guided on all sides.

The adjustment functions in the following manner: By rotation of the worm 34, the worm wheel 36 is rotated and the threaded ring 38 is shifted axially. Depending upon the rotational direction of the worm 34, the shifting movement of the thread ring 38 is modified. The threaded ring 38 takes along in its axial movement, the pot-shaped member 42 rotating with the shaft 22. The racks 48 (FIG. 3) are shifted axially relatively to the driver 50 and effect a synchronous rotation of the shafts 54 by the pinions 56. The toothed wheels 58 effect a mutual shifting of the two eccentrics 30 and 32 in the radial direction either to the maximum adjustment shown in FIG. 7 or the zero position in FIG. 8. The smallest rotational movement of the worm 34 thus means that an infinitely variable adjustment of the eccentrics 30 and 32 takes place. The lifting position of the driving eccentric 30 is transmitted by means of cranks 82 (FIG. 1) to free wheeling gears 84 (known per se), whereby planet wheels 86 are driven, and which planet wheels are in mesh with a sun wheel 88 driving the driven shaft 28.

There may be any number of free wheeling gears 84 but as a rule a plurality of such free wheeling gears is provided.

From the foregoing it will be appreciated that the eccentric 30 rotates with the drive shaft and when the eccentric is displaced in a radial direction, the crank 82 will execute an eccentric movement and actuate continuously the gears 84 during such movement. The free wheeling gears 84 which encompass or surround the shaft 28 are actuated by the crank 82 for having an effect on one of the gears 84, namely, that free wheeling gear with respect to which the eccentricity of the crank 82 is the greatest. The other free wheeling gears 84 are temporarily inoperative or in the free wheeling position, respectively. Since the eccentricity of the crank 82 is continuously variable, there results a continuous variability of the action of the crank 82 on the free wheeling gears. Hence, due to the special design of a continuously variable shift gear, the shaft 88 is driven by way of a certain non-uniformity which, however, is quite small and raises no problem.

The speed adjustment of the driven shaft 28 takes place in an infinitely variable manner both at a standstill and under load from zero (FIG. 8) up to the maximum speed (FIG. 7).

The invention is not to be confined to any strict conformity to the showings in the drawings but changes or modifications may be made therein so long as such changes or modifications mark no material departure from the spirit and scope of the appended claims.

What is claimed is:

1. Eccentric adjustment for an infinitely variable switch gear mechanism, in which the uniform rotational movement of a drive shaft is transformed by means of a gear mechanism, particularly a crank gear or cam gear mechanism in alternative movements of oscillating levers and is reduced by means of one way coupling devices to a periodic rotational movement of a driven shaft, fluctuating around an average value with a driver rotating together with the drive shaft, which driver is provided with at least one freely rotatable pinion which meshes with teeth on one rotating member axially shiftable by an operating device rotating with the drive shaft and which is lockingly connected with teeth of a radially shiftable eccentric piece and the eccentricity adjustment of which adjusts a counterweight synchonously and in the opposite direction in which a driving eccentric and compensation eccentric are provided with teeth facing each other, and in both of which a gear wheel mounted together with a pinion on a common shaft meshes.

2. The eccentric adjustment according to claim 1, in which an eccentric of fork-shaped configuration has its two legs extending symmetrically on both sides parallel to a drive shaft and that each leg has a shaft with one pinion and a toothed wheel with the driving eccentric and compensation eccentric being each provided with a toothed pair.

3. The eccentric adjustment according to claim 2, in which each toothed wheel is arranged between a driver leg and the drive shaft.

4. The eccentric adjustment according to claim 3, in which the shaft carrying the pinion and toothed wheel is provided on its inner end with a counterbearing in the drive shaft.

5. The eccentric adjustment according to claim 4 in which the eccentric is flattened laterally parallel to the legs of the driver.

6. The eccentric adjustment according to claim 5, in which the eccentric is provided in its radial shifting direction with a longitudinal opening with parallel lateral guide surfaces which are guided by interposed flat plates on flattened surfaces of the drive shaft.

7. The eccentric adjustment according to claim 6, in which webs laterally limiting the longitudinal opening have teeth on their front surfaces.

8. The eccentric adjustment according to claim 7, in which sections of the eccentric bridging the webs at both sides of the drive shaft project on the front substantially the radius of the toothed wheel which meshes with the teeth of the webs so that the anterior front surfaces of the projecting sections of both eccentrics facing each other and cooperating with each other contact each other and the guides per se.

9. The eccentric adjustment according to claim 8, in which the axially shiftable member has a fork-like configuration and two parallel axially extending teeth arrangements on each of its parallel legs, with the pinion meshing with said teeth arrangements.

10. The eccentric adjustment according to claim 8, in which the axially shiftable member is of pot-shaped configuration and on the diametrically opposite locations of the wall thereof are two parallel axially extending teeth with the pinion being in mesh with said teeth.

11. The eccentric adjustment according to claim 10, in which the legs or the pot wall respectively, are provided with projections of segment shaped section having recesses for the pinions and a slide guide for the legs of the driver parallel thereto.

12. The eccentric adjustment according to claim 1, in which the driving eccentric and the compensation eccentric are of the same configuration but are arranged on the drive shaft in a reverse manner and peripherally offset by 180°.

13. The eccentric adjustment according to claim 1, in which the teeth driving the pinion are shiftable by means of a worm drive.

References Cited

UNITED STATES PATENTS

| | | | |
|---|---|---|---|
| 3,082,648 | 3/1963 | Toliver | 74—394 X |
| 3,087,355 | 4/1963 | Bassereau | 74—394 X |
| 3,114,273 | 12/1963 | Boggs | 74—394 X |

DONLEY J. STOCKING, *Primary Examiner.*

LEONARD H. GERIN, *Examiner.*